(12) United States Patent
Khamis et al.

(10) Patent No.: US 12,049,199 B2
(45) Date of Patent: Jul. 30, 2024

(54) AUTOMATIC RAIN RESPONSE SYSTEM

(71) Applicant: GM GLOBAL TECHNOLOGY OPERATIONS LLC, Detroit, MI (US)

(72) Inventors: Alaa M. Khamis, Courtice (CA); Kenneth R. Booker, Grosse Pointe Woods, MI (US); Gaurav Talwar, Novi, MI (US); Xu Fang Zhao, LaSalle (CA)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 17/892,067

(22) Filed: Aug. 20, 2022

(65) Prior Publication Data

US 2024/0059252 A1  Feb. 22, 2024

(51) Int. Cl.

| | |
|---|---|
| *B60S 1/08* | (2006.01) |
| *B60S 1/02* | (2006.01) |
| *G10L 25/51* | (2013.01) |
| *H04R 1/40* | (2006.01) |
| *H04R 3/00* | (2006.01) |
| *G01C 21/36* | (2006.01) |

(52) U.S. Cl.
CPC ............ *B60S 1/0866* (2013.01); *B60S 1/026* (2013.01); *B60S 1/0803* (2013.01); *G10L 25/51* (2013.01); *H04R 1/406* (2013.01); *H04R 3/005* (2013.01); *G01C 21/3691* (2013.01); *H04R 2499/13* (2013.01)

(58) Field of Classification Search
CPC ...... B60S 1/0866; B60S 1/026; B60S 1/0803; G10L 25/51; H04R 1/406; H04R 3/005; H04R 2499/13; G01C 21/3691
See application file for complete search history.

(56) References Cited

U.S. PATENT DOCUMENTS

2021/0031725 A1\*  2/2021  Yoo ..................... B60S 1/0881

\* cited by examiner

*Primary Examiner* — Jacob M Amick
(74) *Attorney, Agent, or Firm* — Quinn IP Law (57) ABSTRACT

An automatic rain response system includes microphones of a vehicle, windshield wipers, and a controller. The microphones generate acoustic signals in response to rain. The controller is configured to receive a local weather condition, extract acoustic features from the acoustic signals, form feature vectors in response to the acoustic features and the local weather condition, classify the feature vectors to determine a current class among multiple classes, activate the windshield the wipers at a high speed in response to the current class being a heavy rain on a windshield class, activate the windshield wipers at a medium speed in response to the current class being a freezing rain on the windshield class, activate the windshield wipers at a low speed in response to the current class being a light rain on the windshield class, and deactivate the windshield wipers in response to the current class being a no rain class.

20 Claims, 3 Drawing Sheets

AUTOMATIC RAIN RESPONSE SYSTEM

INTRODUCTION

The present disclosure relates to a system and a method for an automatic rain response system.

Current higher-trim vehicles are equipped with dedicated rain-sensing systems that activate windshield wipers while rain is falling. The rain-sensing systems transmit a beam of infrared light that is reflected back by the rain on the windshield. The reflections are used to determine when to activate and when to stop the windshield wipers. The rain-sensing systems involve an expensive set of components that add costs to the vehicles.

Accordingly, those skilled in the art continue with research and development efforts in the field of low-cost automatic rain response systems for automotive vehicle windshields.

SUMMARY

An automatic rain response system is provided herein. The automatic rain response system includes a plurality of microphones of a vehicle, a plurality of windshield wipers, and a controller. The plurality of microphones is configured to generate a plurality of acoustic signals in response to rain striking a windshield. The controller is in communication with the plurality of microphones, and is configured to receive a local weather condition, extract a plurality of acoustic features from the plurality of acoustic signals, form a plurality of feature vectors in response to the plurality of acoustic features and the local weather condition, classify the plurality of feature vectors to determine a current class among a plurality of classes, activate the plurality of windshield wipers at a high speed in response to the current class being a heavy rain on a windshield class, activate the plurality of windshield wipers at a medium speed in response to the current class being a freezing rain on the windshield class, activate the plurality of windshield wipers at a low speed in response to the current class being a light rain on the windshield class, and deactivate the plurality of windshield wipers in response to the current class being a no rain class.

In one or more embodiments, the automatic rain response system includes a windshield heater in communication with the controller. The controller is further configured to activate the windshield heater in response to the current class being the freezing rain on the windshield class.

In one or more embodiments, the automatic rain response system includes a transceiver in communication with the controller, and configured to transmit the current class to a neighboring vehicle using vehicle-to-vehicle communication.

In one or more embodiments, the automatic rain response system includes a transceiver in communication with the controller, and configured to transmit the current class external to the vehicle using vehicle-to-everything communication.

In one or more embodiments, the automatic rain response system includes a navigation system in communication with the controller and configured to determine a location of the vehicle, and a transceiver in communication with the controller, configured to transmit the location from the vehicle to a weather service provider external to the vehicle, and configured to receive the local weather condition at the vehicle from the weather service provider based on the location of the vehicle.

In one or more embodiments, the automatic rain response system includes a temperature sensor configured to measure an ambient temperature around the vehicle. The ambient temperature determines the local weather condition.

In one or more embodiments, the automatic rain response system includes a receiver configured to receive a neighboring current class from a neighboring vehicle in proximity to the vehicle. The current class of the vehicle is set to the neighboring current class.

In one or more embodiments of the automatic rain response system, the controller is further configured to determine if appropriate to close a window, and recommend or command a closing of the window where appropriate and in response to the classifying being one of the heavy rain on the windshield class, the light rain on the windshield class, or the freezing rain on the windshield class.

In one or more embodiments of the automatic rain response system, the plurality of classes includes a windshield wiper noise class, a turn signal noise class, and an occupant sneezing noise class.

A method for automatic rain response for a vehicle is provided herein. The method includes generating a plurality of acoustic signals with a plurality of microphones of the vehicle in response to rain striking a windshield, extracting a plurality of acoustic features from the plurality of acoustic signals, receiving a local weather condition, forming a plurality of feature vectors in response to the plurality of acoustic features and the local weather condition, classifying the plurality of feature vectors to determine a current class among a plurality of classes, activating a plurality of windshield wipers at a high speed in response to the current class being a heavy rain on a windshield class, activating the plurality of windshield wipers at a medium speed in response to the current class being a freezing rain on the windshield class, activating the plurality of windshield wipers at a low speed in response to the current class being a light rain on the windshield class, and deactivating the plurality of windshield wipers in response to the current class being a no rain class.

In one or more embodiments, the method includes activating a windshield heater in response to the current class being the freezing rain on the windshield class.

In one or more embodiments, the method includes transmitting the current class to a neighboring vehicle using vehicle-to-vehicle communication.

In one or more embodiments, the method includes transmitting the current class external to the vehicle using vehicle-to-everything communication.

In one or more embodiments, the method includes determining a location of the vehicle, transmitting the location from the vehicle to a weather service provider external to the vehicle, and receiving the local weather condition at the vehicle from the weather service provider based on the location of the vehicle.

In one or more embodiments of the method, the local weather condition is determined by measuring an ambient temperature around the vehicle with a temperature sensor of the vehicle.

In one or more embodiments, the method includes receiving a neighboring current class from a neighboring vehicle in proximity to the vehicle, and setting the current class of the vehicle to the neighboring current class.

In one or more embodiments, the method includes determining if appropriate to close a window, and recommending or commanding a closing of the window where appropriate and in response to the classifying being one of the heavy rain on the windshield class, the light rain on the windshield class, or the freezing rain on the windshield class.

In one or more embodiments of the method, the plurality of classes includes a windshield wiper noise class, a turn signal noise class, and an occupant sneezing noise class.

A vehicle is provided herein. The vehicle includes a windshield and an automatic rain response system. The automatic rain response system is in communication with the windshield. The automatic rain response system includes a plurality of microphones, a plurality of windshield wipers, and a controller. The plurality of microphones is configured to generate a plurality of acoustic signals in response to rain striking the windshield. The controller is in communication with the plurality of microphones, and is configured to receive a local weather condition, extract a plurality of acoustic features from the plurality of acoustic signals, form a plurality of feature vectors in response to the plurality of acoustic features and the local weather condition, classify the plurality of feature vectors to determine a current class among a plurality of classes, activate the plurality of windshield wipers at a high speed in response to the current class being a heavy rain on a windshield class, activate the plurality of windshield wipers at a medium speed in response to the current class being a freezing rain on the windshield class, activate the plurality of windshield wipers at a low speed in response to the current class being a light rain on the windshield class, and deactivate the plurality of windshield wipers in response to the current class being a no rain class.

In one or more embodiments of the vehicle, the automatic rain response system is characterized by a lack of a dedicated rain sensor.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure an automatic rain response system that utilizes microphone components to capture non-speech transient noise caused by rain drops falling on a windshield of a vehicle. The non-speech noise is classified using garbage modeling to isolate the rain drop noise from other transient noise types, such as windshield wiper noises, lip smacking noises, sneezing noises, turn signal noises, and the like. The classification also quantifies an intensity of the rain drop noises. For example, the rain may be classified as a heavy rain, a light rain, a freezing (medium) rain, and no rain. A rejection threshold (e.g., posterior conditional probability) may be calibrated to a high level to minimize false alerts. In some embodiments, the microphones may be on an exterior of the vehicle to accurately capture road noises. In various embodiments, interior microphones, such as rear view mirror microphones, headliner microphones and/or overhead console microphones may be used to detect the rain striking the windshield. Upon successful audio-based classification of the rain drops falling on the windshield, a vehicle network-based message may be triggered and windshield wipers activated to a default level. The automatic rain response system may serve as a replacement for dedicated rain-sensing systems and thus helps to save component costs. Thus, the vehicle is characterized by a lack of a dedicated rain sensor.

Figure 1:
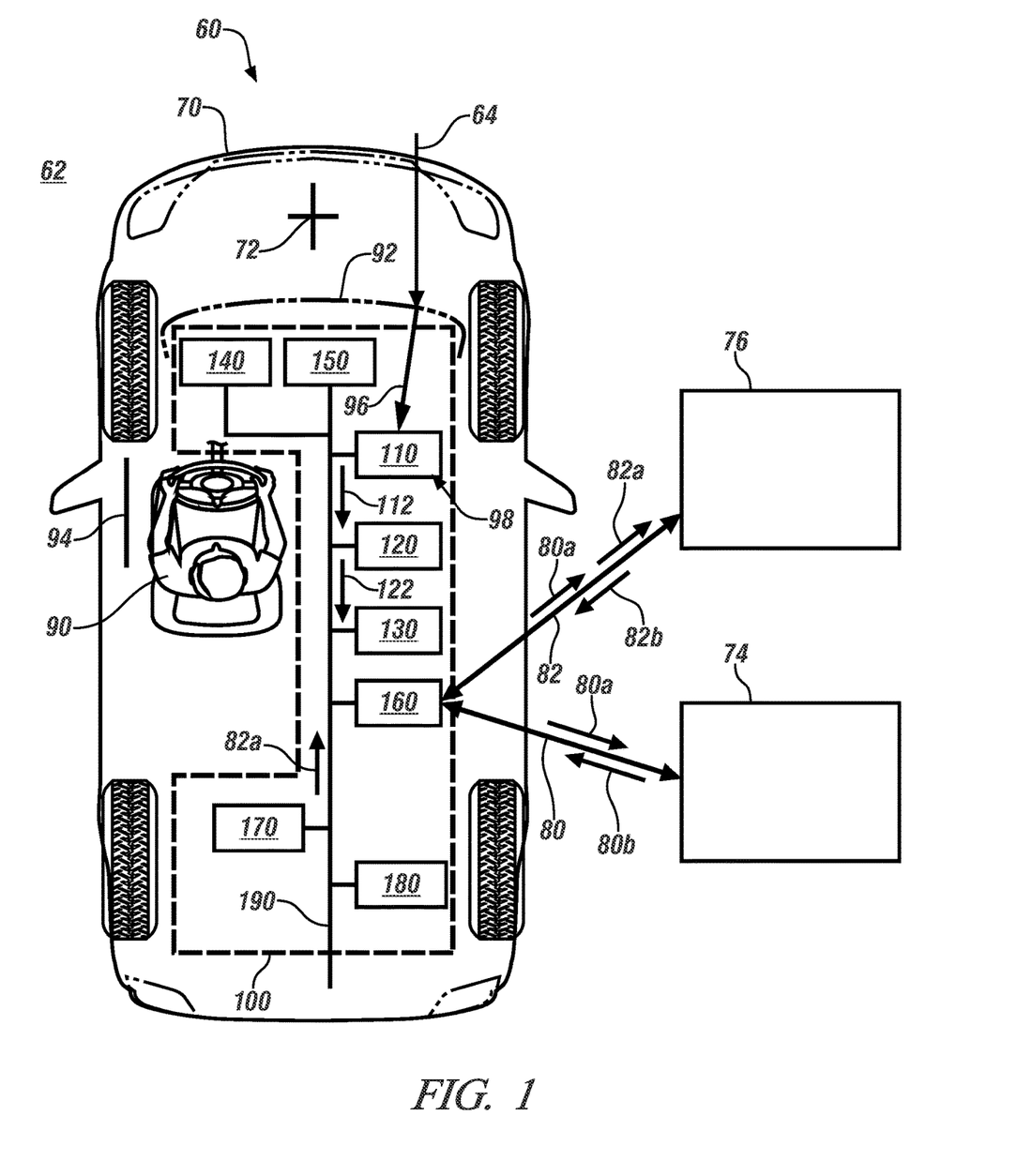
FIG. 1 is a schematic plan diagram of an environment around a vehicle in accordance with one or more exemplary embodiments.

Referring to FIG. 1, a schematic plan diagram of an example context of an environment 60 around a vehicle 70 is shown in accordance with one or more exemplary embodiments. The environment 60 may include an atmosphere at an ambient temperature 62 and rain 64 at various times. The vehicle 70 resides on the ground (e.g., a roadway) at a current location 72. One or more neighboring vehicles 74 (one shown) may be in the vicinity of the vehicle 70. One or more weather service providers 76 (one shown) may be within radio-communication range of the vehicle 70.

The vehicle 70 is designed to carry a driver 90 and one or more passengers (not shown). The vehicle 70 includes an automatic rain response system 100. The automatic rain response system 100 includes a windshield 92, one or more windows 94 (one shown), and an automatic rain response system 100. The automatic rain response system 100 generally includes multiple microphones 110, a temperature sensor 120, a controller 130, multiple windshield wipers 140 (front wipers are shown), a windshield heater 150 (front heater is shown), a transceiver 160, a navigation system 170, an active noise cancellation system 180, and a communication bus 190.

The rain 64 striking the windshield 92 may generate a rain noise 96. Characteristics of the rain noise 96 depend on a density of the rain 64, a windspeed, and a speed of the vehicle 70. The rain noise 96 is sensed by the microphones 110. The microphones 110 may also sense other ambient noise 98 originating from both inside the vehicle 70 and outside the vehicle 70.

Vehicle-to-vehicle (V2V) communication 80 may be established between the automatic rain response system 100 and the neighboring vehicle(s) 74. The vehicle-to-vehicle communication 80 may transfer information for a current class 80a of the rain 64 detected by the vehicle 70. The current class 80a may be used by the neighboring vehicle(s) 74 as a status of the rain 64 in the area. The vehicle-to-vehicle communication may transfer information for a neighboring current class 80b of the rain 64 detected by the neighboring vehicle(s) 74. The neighboring current class 80b may be used by the vehicle 70 as a status of the rain 64 at the location 72.

Vehicle-to-everything (V2X) communication 82 may be established between the automatic rain response system 100 and the weather service provider(s) 76. The vehicle-to-everything communication 82 may transfer the location 72 of the vehicle 70 to the weather service provider(s) 76. In response, the weather service provider(s) 76 returns a local weather condition 82b to the vehicle 70 based on the location 72. The local weather condition 82b may include one or both of a status of the rain 64 at the location 72 and/or an ambient temperature 62 at the location 72 of the vehicle 70. In some embodiments, the automatic rain response system 100 acts as a roving weather station and transmits the current class 80a of the rain 64 to the weather service provider(s) 76.

Multiple acoustic signals 112 are generated by the microphones 110 and transferred to the controller 130 via the communication bus 190. The acoustic signals convey both the rain noise 96 and the ambient noise 98.

A temperature signal 122 is generated by the temperature sensor 120 and transferred to the controller 130 on the communication bus 190. The temperature signal carries data for the ambient temperature 62 of the air around the vehicle 70.

The vehicle 70 implements a gas-powered vehicle, an electric vehicle, a hybrid vehicle, or a plug-in hybrid vehicle. In various embodiments, the vehicle 70 may include, but is not limited to, a passenger vehicle, a truck, an autonomous vehicle, a motorcycle, a boat, and/or an aircraft. Other types of vehicles 70 may be implemented to meet the design criteria of a particular application.

The windshield 92 implements a typical vehicle front windshield. The windshield 92 may be subjected to the rain 64 from time to time. The rain 64 striking the windshield 92 generates the rain noise 96. Although the front windshield is discussed herein, the technique of the disclosure may be applied to a read windshield with rear wipers and/or a read windshield heater.

The windows 94 implement one or more of side windows and/or sun roofs. The windows 94 may be powered to transition between an open condition and a closed condition in response to control signals received via the communication bus 190.

The automatic rain response system 100 implements a distributed rain sensing and windshield wiper control system. The automatic rain response system 100 is operational to generate the acoustic signals 112 in response to the rain 64 hitting the windshield 92, extract acoustic features from the acoustic signals 112, and determine a local weather condition from the temperature sensor 120, the neighboring current class 80b received from a neighboring vehicle 74 and/or from the weather service provider 76. The automatic rain response system 100 subsequently forms feature vectors in response to the acoustic features and the local weather condition, and classifies the feature vectors to determine the current class 80a among multiple possible classes. The automatic rain response system 100 responds to rain classes, where detected, by activating the windshield wipers 140. The windshield wipers 140 may be set to a high speed, a medium speed, a low speed, or off (e.g., no speed) based on the classification results. Where the classification determines that the rain 64 is a freezing rain, the windshield wipers 140 may be set to the medium speed and the windshield heater 150 is activated.

In various embodiments, the automatic rain response system 100 may transmit the current class 80a to one or more neighboring vehicles 74 and/or to one or more weather service providers 76. If the windows 94 are open when the rain 64 is initially detected, the automatic rain response system 100 sends signals to close the open windows 94, even if the vehicle 70 is powered down (e.g., engine off).

The microphones 110 implement exterior and/or interior microphones. In various embodiments, the microphones 110 may include road noise cancellation (RNC) microphones. The microphones 110 are operational to convert the rain noise 96 and the ambient noise 98 into the acoustic signals 112. The acoustic signals 112 are transferred to the controller 130 via the communication bus 190.

The temperature sensor 120 implements an air temperature sensor. The temperature sensor 120 is operational to detect the ambient temperature 62 of the air around the vehicle 70 and report the detected temperature in the temperature signal 122 to the controller 130. The temperature sensor 120 enables the controller 130 to differentiate between freezing rain and non-freezing rain.

The controller 130 implements one or more electronic control units. In various embodiments, the controller 130 may be implemented in a body controller of the vehicle 70. The controller 130 is operational to receive the acoustic signals 112, the temperature signal 122 and the local weather condition 82b from the weather service providers 76 and/or the neighboring current class 80b from the neighboring vehicles 74. The controller 130 uses the gathered information to extract the features from the acoustic signals 112, form the feature vectors in response to the acoustic features and the local weather condition 82b and/or the neighboring current class 80b, classify the feature vectors to determine the current class 80a, and activate/deactivate windshield wipers 140 and the windshield heater 150 while the current class 80a is one of the rain classifications.

In various embodiments, the controller 130 generally comprises at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be an electronic processor (implemented in hardware, software executing on hardware, or a combination of both). The at least one microcontroller may also include tangible, non-transitory memory (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the at least one microcontroller (either in the foreground or background). The at least one microcontroller may receive commands and information, in the form of one or more input signals from various controls or components in the vehicle 70 and communicate instructions to the other electronic components.

The windshield wipers 140 implement one or a pair of front wipers and/or rear wipers. The windshield wipers 140 are operational to clear the rain 64 from the windshield 92 when active. An on/off state and a speed of the windshield wipers 140 is controlled via commands on the communication bus 190. The commands may originate from the controller 130 and from manual controls available to the driver 90.

The windshield heater 150 implements a front windshield defroster and/or rear windshield defroster. The windshield heater 150 is operational to clear freezing rain 64, sleet, snow and frost from the windshield 92 when active. An on/off state and a speed of the windshield heater 150 is controlled via commands on the communication bus 190.

The commands may originate from the controller 130 and from manual controls available to the driver 90.

The transceiver 160 implements a radio-frequency transmitter and receiver. The transceiver 160 is operational to provide bidirectional communications between the controller 130 and the neighboring vehicles 74 (e.g., V2V communication) and between the controller 130 and the weather service providers 76 (e.g., V2X communication).

The navigation system 170 implements an inertial navigation system, a cellular triangulation system, and/or a Global Positioning System (GPS) receiver. The navigation system 170 is operational to determine the location 72 of the vehicle 70 in real time. The location 72 is transferred to the controller 130 via the communication bus 190.

The active noise cancellation system 180 is operational to dampen (or lower) road noises experienced inside the vehicle 70. The active noise cancellation system 180 is generally activated while the classification of the acoustic signals 112 determines that a moderate to heavy rain 64 is present.

The communication bus 190 implements a bidirectional digital bus. The communication bus 190 is operational to exchange data among at least the microphones 110, the temperature sensor 120, the controller 130, the windshield wipers 140, the windshield heater 150, the transceiver 160 and the navigation system 170. Other electronics within the vehicle 70 may communicate on the communication bus 190 to meet the design criteria of a particular application.

In various embodiments, the controller 130 implements a speech recognition engine that performs the feature vector formation and classification. The speech recognition engine may be located within an infotainment head unit and/or other electronic control unit(s). The speech recognition engine has a garbage modeling feature that identifies non-speech sounds (e.g., noise types). The garbage modeling may accurately classify transient noise types, such as rain drops, windshield wipers, lip smacks, sneezing, turn signals, and the like. Windshield wiper speed, window/sunroof level and/or heated windshield on/off are controlled according to the recognized rain level and in accordance with Federal Motor Vehicle Safety Standard (FMVSS) 118/S6 for remote closure control of movable glass (e.g., windows, sunroof, etc.).

Figure 2:
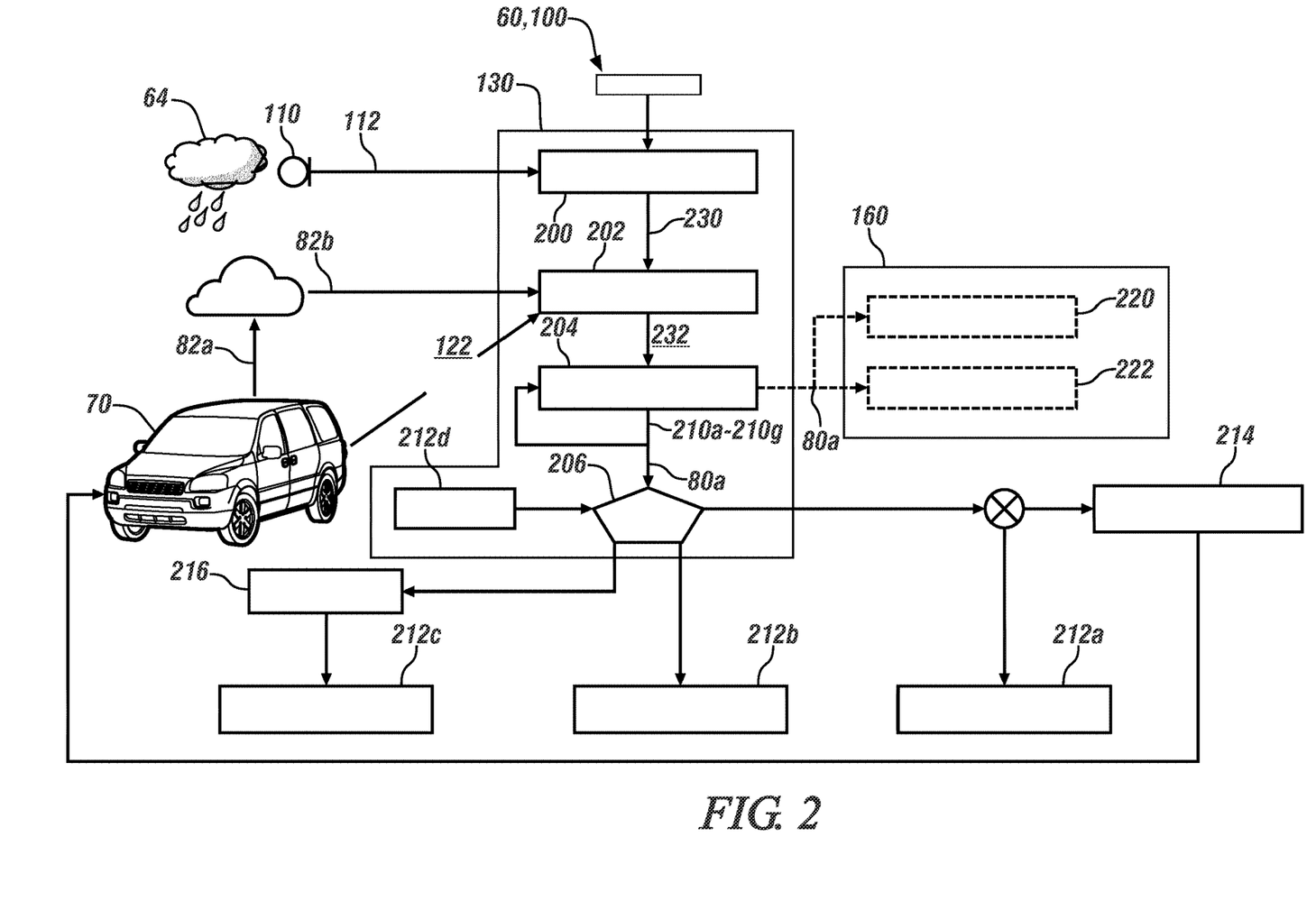
FIG. 2 is a schematic diagram of an automatic rain response system within the environment in accordance with one or more exemplary embodiments.

Referring to FIG. 2, a schematic diagram of an example implementation of the automatic rain response system 100 within the environment 60 is shown in accordance with one or more exemplary embodiments. Features implemented in the controller 130 include feature extraction 200, feature vector formation 202, a multiclass classifier 204, and level decision 206.

The rain 64 striking the windshield 92 is converted into the acoustic signals by the microphones 110. The feature extraction 200 determines acoustic features from the acoustic signals 112. The acoustic features are extracted with a high discrimination power to recognize multiple rain levels (e.g., no rain, light rain, heavy rain). By way of example, the acoustic features 230 may include, but are not limited to, Mel-frequency cepstral coefficients (MFCCs), filterbank energies, log filterbank energies, and spectral subband centroids. The acoustic features 230 are subsequently presented to the feature vector formation 202.

The feature vector formation 202 receives the acoustic features 230 from the feature extraction 200, the local weather condition 82b from the weather service provider via the controller 130, and an ambient temperature in the ambient temperature signal 122. Based on the data received, the feature vector formation 202 is operational to generate a sequence of feature vectors 232. The feature vector formation 202 includes features that lead to maximum variance in terms of Eigen values and Eigen vectors. Besides Mel cepstrum and subspace centroids, other features such as delta cepstrum, perceptual linear prediction (PLP), and linear prediction coefficients (LPC) provide good classification of transient non-speech sounds. The feature vectors 232 are transferred to the multiclass classifier 204.

The multiclass classifier 204 is operational to classify the feature vectors 232 among multiple classes 210a-210g and determine the current class 80a. The classes 210a-210g may include, but are not limited to, a heavy rain on a windshield class 210a, a light rain on the windshield class 210b, a freezing rain on the windshield class 210c, a no rain class 210d, a windshield wiper noise class 210e, a turn signal noise class 210f, and an occupant sneezing noise class 210g. The current class 80a is presented to the level decision 206, fed back to the multiclass classifier 204 for adaptation, and optionally provided to the transceiver 160 for transmission to other destinations remote from the vehicle 70. In various embodiments, the rain recognition classification is continuously adapted using the data collected through retraining and over the air updates (OTA) following transfer learning and/or continual learning approaches.

The level decision 206 is operational to examine the current class 80a. If the current class 80a is one of the rain-related classes 210a-210d, the level decision 206 determines which rain-related class 210a-210d has been detected. Where the current class 80a is the heavy rain on the windshield class 210a, the level decision 206 activates 212a the windshield wipers 140 to a high speed. The level decision 206 may also enable the active noise cancellation system 214, if implemented, to lower the sound of the heavy rain inside the passenger compartment of the vehicle 70.

The active noise cancellation system 214 is switched on if heavy rain is detected in order to reduce transient noise effects. The transient noise data includes noise from windshield wipers, beeps, phone or dual tone multi-frequency (DTMF) tones, etc. The vehicle 70 may have pre-loaded noise acoustic models that are trained offline and persistently adapted using transient noise data. The active noise cancellation system 214 uses noise acoustic models and real-time rain classification result, to reduce the transient noise in vehicle 70.

Where the current class 80a is the light rain on the windshield class 210b, the level decision 206 activates 212b the windshield wipers 140 to a low speed. Where the current class 80a is the freezing rain on the windshield class 210c, the level decision 206 activates the heated windshield system 216 and activates 212c the windshield wipers 140 to a medium speed. Where the current class 80a is the no rain class 210d, the level decision 206 deactivates 212d the windshield wipers 140 if currently active. For the rain-related classes 210a-210c, activation of the windshield wipers 140 may be accompanied by closing open window(s)/sunroof 94, if appropriate.

In some instances, the transceiver 160 may share the data in the current class 80a using vehicle-to-vehicle communications 220. The vehicle-to-vehicle communications 220 alerts the neighboring vehicle(s) 74 of the possible rain within a geofenced area to equip the neighboring vehicle(s) 74 with a virtual rain sensor. The transceiver 160 may also share the data in the current class 80a using vehicle-to-everything communications 222 such that the vehicle 70 acts as a mobile weather station within an infrastructure.

Figure 3:
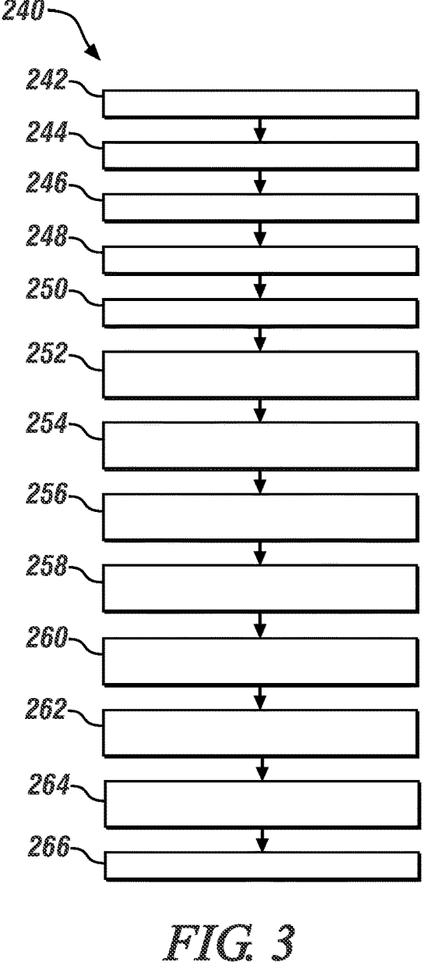
FIG. 3 is a flow diagram of a method for automatic rain response in the vehicle in accordance with one or more exemplary embodiments

Referring to FIG. 3, a flow diagram of an example implementation of a method 240 for automatic rain response in the vehicle 70 is shown in accordance with one or more exemplary embodiments. The method (or process) 240 is implemented by the automatic rain response system 100. The method 240 generally includes steps 242 to 266, as illustrated. The sequence of steps is shown as a representative example. Other step orders may be implemented to meet the criteria of a particular application.

In the step 242, the acoustic signals 112 are generated with the microphones 110 of the vehicle 70. The acoustic features 230 are extracted from the acoustic signals in the step 244 by the feature extraction 200 in the controller 130. In the step 246, the local weather condition 82*b* is determined. In various embodiments, the local weather condition 82*b* may be determined by measuring the ambient temperature 62 around the vehicle 70 with the temperature sensor 120. The feature vectors 232 are formed in response to the acoustic features 230 and the local weather condition 82*b* in the step 248 using the feature vector formation 202.

In the step 250, the multiclass classifier 204 may classify the feature vectors to determine a current class 80*a* among the possible classes 210*a*-210*g*. The level decision 206 activates 212*a* the windshield wipers 140 at the high speed in the step 252 in response to the current class 80*a* being a heavy rain on a windshield class 210*a*. In the step 254, the level decision 206 activates 212*c* the windshield wipers 140 at the medium speed in response to the current class 80*a* being the freezing rain on the windshield class 210*c*. The level decision 206 may also activate the windshield heater 150 in the step 256 in response to the current class 80*a* being the freezing rain on the windshield class 210*c*. In the step 258, the level decision 206 activates 212*c* the windshield wipers 140 at the low speed in response to the current class 80*a* being the light rain class on the windshield class 210*c*. In the step 260, the level decision 206 deactivates 212*d* the windshield wipers 140 in response to the current class 80*a* being the no rain class 210*d*. In the step 262, the controller 130 may command the transceiver 160 to transmit the current class 80*a* that represents the rain/no rain state (e.g., classes 210*a*-210*d*) to the neighboring vehicle(s) 74.

In the step 264, the controller 130 may determine if closing the window(s) 94 is appropriate. If the appropriate criteria are meet, the controller 130 may recommend or command closing the window(s) 94 in response to the current class 80*a* being one of the heavy rain on the windshield class 210*a*, the light rain on the windshield class 210*b*, or the freezing rain on the windshield class 210*c* in the step 266. In various embodiments, the controller 130 may leave the window(s) 94 unmoved despite the presence of the rain 64.

Figure 4:
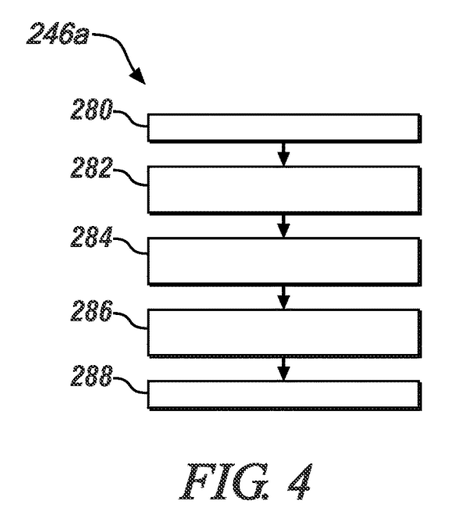
FIG. 4 is a flow diagram for determining a local weather condition in accordance with one or more exemplary embodiments.

Referring to FIG. 4, a flow diagram of an example implementation of a step 246*a* for determining the local weather condition is shown in accordance with one or more exemplary embodiments. The step 246*a* is implemented by the automatic rain response system 100 and a weather service provider 76. The step 246*a* is a variation of the step 246. The step 246*a* generally includes steps 280 to 288, as illustrated. The sequence of steps is shown as a representative example. Other step orders may be implemented to meet the criteria of a particular application.

In the step 280, the navigation system 170 determines the location 72 of the vehicle 70. The controller 130 commands the transceiver 160 to transmit the location 72 in the step 282 from the vehicle 70 to a weather service provider 76 that is external to the vehicle 70. The weather service provider 76 responds to the location 72 in the step 284 by returning the local weather condition 82*b* at the location 72. In the step 286, the transceiver 160 receives the local weather condition 82*b* at the vehicle 70 from the weather service provider 76 based on the location 72. The controller 130 substitutes or blends the features of the local weather condition 82*b* received from the weather service provider 76 with the acoustic features 230 determined by the feature extraction 200 in the step 288.

Figure 5:
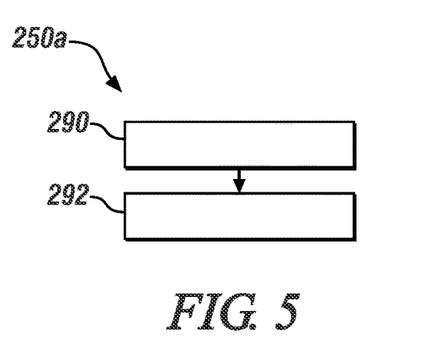
FIG. 5 is a flow diagram for determining a current class in accordance with one or more exemplary embodiments.

Referring to FIG. 5, a flow diagram of an example implementation of a step 250*a* for determining the current class is shown in accordance with one or more exemplary embodiments. The step 250*a* is implemented by the automatic rain response system 100 and a neighboring vehicle 74. The step 250*a* is a variation of the step 250. The step 250*a* generally includes steps 290 to 292, as illustrated. The sequence of steps is shown as a representative example. Other step orders may be implemented to meet the criteria of a particular application.

In the step 290, the transceiver 160 may receive the neighboring current class 80*b* (FIG. 1) from the neighboring vehicle 74 in proximity to the vehicle 70. In the step 292, the controller 130 sets the current class 80*a* to the neighboring current class 80*b* as received from the neighboring vehicle 74. Therefore, the vehicle 70 may be aware of the falling rain 64 while the vehicle 70 is in a tunnel, or other shelter that blocks the rain 64, by using the neighboring vehicle 74 as a nearby weather station.

While the best modes for carrying out the disclosure have been described in detail, those familiar with the art to which this disclosure relates will recognize various alternative designs and embodiments for practicing the disclosure within the scope of the appended claims.

What is claimed is:

1. An automatic rain response system comprising:
   a plurality of microphones of a vehicle configured to generate a plurality of acoustic signals in response to rain striking a windshield;
   a plurality of windshield wipers; and
   a controller in communication with the plurality of microphones, and configured to:
   receive a local weather condition;
   extract a plurality of acoustic features from the plurality of acoustic signals;
   form a plurality of feature vectors in response to the plurality of acoustic features and the local weather condition;
   classify the plurality of feature vectors to determine a current class among a plurality of classes;
   activate the plurality of windshield wipers at a high speed in response to the current class being a heavy rain on a windshield class;
   activate the plurality of windshield wipers at a medium speed in response to the current class being a freezing rain on the windshield class;
   activate the plurality of windshield wipers at a low speed in response to the current class being a light rain on the windshield class; and
   deactivate the plurality of windshield wipers in response to the current class being a no rain class.

2. The automatic rain response system according to claim 1, further comprising:
   a windshield heater in communication with the controller, wherein the controller is further configured to activate the windshield heater in response to the current class being the freezing rain on the windshield class.

3. The automatic rain response system according to claim 1, further comprising:

a transceiver in communication with the controller, and configured to transmit the current class to a neighboring vehicle using vehicle-to-vehicle communication.

4. The automatic rain response system according to claim 1, further comprising:
a transceiver in communication with the controller, and configured to transmit the current class external to the vehicle using vehicle-to-everything communication.

5. The automatic rain response system according to claim 1, further comprising:
a navigation system in communication with the controller, and configured to determine a location of the vehicle; and
a transceiver in communication with the controller, configured to transmit the location from the vehicle to a weather service provider external to the vehicle, and configured to receive the local weather condition at the vehicle from the weather service provider based on the location of the vehicle.

6. The automatic rain response system according to claim 1, further comprising:
a temperature sensor configured to measure an ambient temperature around the vehicle, wherein the ambient temperature determines the local weather condition.

7. The automatic rain response system according to claim 1, further comprising:
a receiver configured to receive a neighboring current class from a neighboring vehicle in proximity to the vehicle, wherein the current class of the vehicle is set to the neighboring current class.

8. The automatic rain response system according to claim 1, wherein the controller is further configured to:
determine if appropriate to close a window; and
recommend or command a closing of the window where appropriate and in response to the classifying being one of the heavy rain on the windshield class, the light rain on the windshield class, or the freezing rain on the windshield class.

9. The automatic rain response system according to claim 1, wherein the plurality of classes includes a windshield wiper noise class, a turn signal noise class, and an occupant sneezing noise class.

10. A method of automatic rain response for a vehicle, the method comprising:
generating a plurality of acoustic signals with a plurality of microphones of the vehicle in response to rain striking a windshield;
extracting a plurality of acoustic features from the plurality of acoustic signals;
receiving a local weather condition;
forming a plurality of feature vectors in response to the plurality of acoustic features and the local weather condition;
classifying the plurality of feature vectors to determine a current class among a plurality of classes;
activating a plurality of windshield wipers at a high speed in response to the current class being a heavy rain on a windshield class;
activating the plurality of windshield wipers at a medium speed in response to the current class being a freezing rain on the windshield class;
activating the plurality of windshield wipers at a low speed in response to the current class being a light rain on the windshield class; and
deactivating the plurality of windshield wipers in response to the current class being a no rain class.

11. The method according to claim 10, further comprising:
activating a windshield heater in response to the current class being the freezing rain on the windshield class.

12. The method according to claim 10, further comprising:
transmitting the current class to a neighboring vehicle using vehicle-to-vehicle communication.

13. The method according to claim 10, further comprising:
transmitting the current class external to the vehicle using vehicle-to-everything communication.

14. The method according to claim 10, further comprising:
determining a location of the vehicle;
transmitting the location from the vehicle to a weather service provider external to the vehicle; and
receiving the local weather condition at the vehicle from the weather service provider based on the location of the vehicle.

15. The method according to claim 10, wherein the local weather condition is determined by measuring an ambient temperature around the vehicle with a temperature sensor of the vehicle.

16. The method according to claim 10, further comprising:
receiving a neighboring current class from a neighboring vehicle in proximity to the vehicle; and
setting the current class of the vehicle to the neighboring current class.

17. The method according to claim 10, further comprising:
determining if appropriate to close a window; and
recommending or commanding a closing of the window where appropriate and in response to the classifying being one of the heavy rain on the windshield class, the light rain on the windshield class, or the freezing rain on the windshield class.

18. The method according to claim 10, wherein the plurality of classes includes a windshield wiper noise class, a turn signal noise class, and an occupant sneezing noise class.

19. A vehicle comprising:
a windshield; and
an automatic rain response system in communication with the windshield, the automatic rain response system including:
a plurality of microphones configured to generate a plurality of acoustic signals in response to rain striking the windshield;
a plurality of windshield wipers; and
a controller in communication with the plurality of microphones, and configured to:
receive a local weather condition;
extract a plurality of acoustic features from the plurality of acoustic signals;
form a plurality of feature vectors in response to the plurality of acoustic features and the local weather condition;
classify the plurality of feature vectors to determine a current class among a plurality of classes;
activate the plurality of windshield wipers at a high speed in response to the current class being a heavy rain on a windshield class;
activate the plurality of windshield wipers at a medium speed in response to the current class being a freezing rain on the windshield class;

activate the plurality of windshield wipers at a low speed in response to the current class being a light rain on the windshield class; and deactivate the plurality of windshield wipers in response to the current class being a no rain class.

20. The vehicle according to claim 19, wherein the automatic rain response system is characterized by a lack of a dedicated rain sensor.

* * * * *